(12) United States Patent
Wang

(10) Patent No.: US 9,684,118 B2
(45) Date of Patent: Jun. 20, 2017

(54) METHOD FOR IMPROVING LUMINANCE UNIFORMITY OF SIDE-EDGE CURVED MODULE

(71) Applicant: Shenzhen China Star Optoelectronics Technology Co., Ltd., Shenzhen, Guangdong (CN)

(72) Inventor: Jiangfeng Wang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 388 days.

(21) Appl. No.: 14/378,385

(22) PCT Filed: May 28, 2014

(86) PCT No.: PCT/CN2014/078669
§ 371 (c)(1),
(2) Date: Aug. 13, 2014

(87) PCT Pub. No.: WO2015/168967
PCT Pub. Date: Nov. 12, 2015

(65) Prior Publication Data
US 2016/0334565 A1 Nov. 17, 2016

(30) Foreign Application Priority Data
May 4, 2014 (CN) .......................... 2014 1 0184524

(51) Int. Cl.
*G01N 21/00* (2006.01)
*G09G 3/36* (2006.01)
(Continued)

(52) U.S. Cl.
CPC ........... *G02B 6/0061* (2013.01); *G02B 6/004* (2013.01); *G02F 1/1336* (2013.01); *G02F 1/133604* (2013.01); *G02F 1/133611* (2013.01)

(58) Field of Classification Search
CPC ... G09G 2320/0233; G09G 2320/0276; G09G 2320/028; G09G 2320/0285; G09G 2320/068; G09G 2320/0693
(Continued)

(56) References Cited

U.S. PATENT DOCUMENTS

| | | | |
|---|---|---|---|
| 2006/0215386 A1* | 9/2006 | Hatanaka | G02B 5/0242 362/97.1 |
| 2008/0191985 A1* | 8/2008 | Katayama | G09G 3/006 345/89 |
| 2009/0003002 A1* | 1/2009 | Sato | G02B 6/0043 362/341 |

* cited by examiner

*Primary Examiner* — Sunghee Y Gray
(74) *Attorney, Agent, or Firm* — Andrew C. Cheng

(57) ABSTRACT

The present invention relates to a method for improving luminance uniformity of a side-edge curved module. The method includes: (1) dividing a display zone of a curved panel display zone into a plurality of panel grid cells and sequentially marking the plurality of grid cells as panel grid cells 1-n, where n is a natural number; (2) dividing a light guide plate located exactly under the curved panel display zone into a plurality of corresponding light guide plate grid cells, each of the light guide plate grid cells having a dot density being indicated by Pn; (3) measuring transmittance of each of the panel grid cells, the transmittance of each of the panel grid cells being indicated by tn; and (4) taking the transmittance tc of the panel grid cell c that is located close to a center of the curved panel display zone as a reference, where c is a natural number less than n and the dot density of the light guide plate grid cell c corresponding to the panel grid cell c is indicated by Pc, wherein the dot density Pn of a light guide plate grid cell n is set between Pc×0.25×tc/tn to Pc×4×tc/tn. The present invention helps eliminate dark zones of a curved module and improves the luminance uniformity without increasing the product design expenditure.

13 Claims, 6 Drawing Sheets

(51) Int. Cl.
  *G09G 5/02* (2006.01)
  *F21V 8/00* (2006.01)
  *G02F 1/1335* (2006.01)
(58) Field of Classification Search
  USPC .......................................................... 356/432
  See application file for complete search history.

|  | W |  |  |  |  |  |  |  |  |
|---|---|---|---|---|---|---|---|---|---|
|  | 3W/20 | W/10 | W/10 | W/10 | W/10 | W/10 | W/10 | W/10 | 3W/20 |
| 3H/20 | 1 | 2 | 3 | 4 | 5 | 6 | 7 | 8 | 9 |
| H/10 | 10 | 11 | 12 | 13 | 14 | 15 | 16 | 17 | 18 |
| H/10 | 19 | 20 | 21 | 22 | 23 | 24 | 25 | 26 | 27 |
| H/10 | 28 | 29 | 30 | 31 | 32 | 33 | 34 | 35 | 36 |
| H/10 | 37 | 38 | 39 | 40 | 41 | 42 | 43 | 44 | 45 |
| H/10 | 46 | 47 | 48 | 49 | 50 | 51 | 52 | 53 | 54 |
| H/10 | 55 | 56 | 57 | 58 | 59 | 60 | 61 | 62 | 63 |
| H/10 | 64 | 65 | 66 | 67 | 68 | 69 | 70 | 71 | 72 |
| 3H/20 | 73 | 74 | 75 | 76 | 77 | 78 | 79 | 80 | 81 |

Fig. 4C

| t1 | t2 | t3 | t4 | t5 | t6 | t7 | t8 | t9 |
|---|---|---|---|---|---|---|---|---|
| t10 | t11 | t12 | t13 | t14 | t15 | t16 | t17 | t18 |
| t19 | t20 | t21 | t22 | t23 | t24 | t25 | t26 | t27 |
| t28 | t29 | t30 | t31 | t32 | t33 | t34 | t35 | t36 |
| t37 | t38 | t39 | t40 | t41 | t42 | t43 | t44 | t45 |
| t46 | t47 | t48 | t49 | t50 | t51 | t52 | t53 | t54 |
| t55 | t56 | t57 | t58 | t59 | t60 | t61 | t62 | t63 |
| t64 | t65 | t66 | t67 | t68 | t69 | t70 | t71 | t72 |
| t73 | t74 | t75 | t76 | t77 | t78 | t79 | t80 | t81 |

Fig. 5A

| 0.6× t41/t1 | 0.6× t41/t2 | 0.6× t41/t3 | 0.6× t41/t4 | 0.6× t41/t5 | 0.6× t41/t6 | 0.6× t41/t7 | 0.6× t41/t8 | 0.6× t41/t9 |
| 1.5× t41/t1 | 1.5× t41/t2 | 1.5× t41/t3 | 1.5× t41/t4 | 1.5× t41/t5 | 1.5× t41/t6 | 1.5× t41/t7 | 1.5× t41/t8 | 1.5× t41/t9 |
|---|---|---|---|---|---|---|---|---|
| ...... | ...... | ...... | ...... | ...... | ...... | ...... | ...... | ...... |
| ...... | ...... | ...... | ...... | ...... | ...... | ...... | ...... | ...... |
| ...... | ...... | ...... | ...... | ...... | ...... | ...... | ...... | ...... |
| ...... | ...... | ...... | ...... | ...... | ...... | ...... | ...... | ...... |
| ...... | ...... | ...... | ...... | ...... | ...... | ...... | ...... | ...... |
| ...... | ...... | ...... | ...... | ...... | ...... | ...... | ...... | ...... |
| ...... | ...... | ...... | ...... | ...... | ...... | ...... | ...... | ...... |
| ...... | ...... | ...... | ...... | ...... | ...... | ...... | ...... | ...... |

METHOD FOR IMPROVING LUMINANCE UNIFORMITY OF SIDE-EDGE CURVED MODULE

BACKGROUND OF THE INVENTION

1. Field of the Invention

The present invention relates to the field of liquid crystal displaying, and in particular to a method for improving luminance uniformity of a side-edge curved module.

2. The Related Arts

Recently, double-sided modules have become a talking-point due to the unique outside appearance. A curved module is generally made up of a combination of a curved panel and a corresponding backlight module. However, designing a curved module often face special issues, of which one is poor luminance uniformity. Referring to FIGS. 1A and 1B, FIG. 1A is a schematic view of a conventional curved module, illustrating dark zones present in two end portions of a curved module of poor luminance uniformity. FIG. 1B is a simulated luminance distribution diagram of the conventional curved module, in which a color brightness diagram is shown to indicate the distribution of luminance of the curved module, wherein the two end portions of the curved module are darker, while the central portion is brighter. Poor luminance uniformity results in low module taste and makes a product out specification.

Referring to FIG. 2, which is a schematic view illustrating a theorem that luminance uniformity deteriorates in a conventional curved module, when a panel is curved, upper and lower glass substrates partly shift with respect to each other, making a black matrix formed on the upper glass substrate no longer in alignment with data lines formed on the lower glass substrate, so that the data lines are displaced outside the black matrix. The data lines that are displaced outside the black matrix would shield a part of pixels, leading to deterioration of panel transmittance and module luminance. The shift is of different amounts at different portions of a panel. It is often that the shift at two ends is severe, while that at the center is slight and this makes the two ends of the module darker and the center brighter, leading to deterioration of the uniformity of luminance.

A solution that is adopted heretofore starts with the panel, such as increase of the width of the black matrix and compensation of the total pitch. However, these solutions need modification of photo masks, which requires additional investment of capitals. Further, they also cause lowering of overall transmittance of a panel, leading to lowering of overall luminance of the module. To increase the luminance of the module, additional expenditure is necessary for designing backlighting.

A curved module generally includes a side-edge backlight module to supply displaying light to a liquid crystal panel in order to display image on the liquid crystal panel. The side-edge backlight module is generally composed of a light guide plate and a light source. The function of the light guide plate is guiding the direction of scattering of light in order to enhance the luminance of the panel and achieve uniformity of luminance of the panel. The quality of the light guide plate poses a great influence on the backlighting. Generally, the surface of the light guide plate is quite smooth and flat so that most of the internal light gets regularly total reflection on the flat and smooth surface without transmitting outside the light guide plate. The bottom of the light guide plate is often provided with dot structures arranged in the form of a grid. Light no longer follows regular total reflection at the sites where the dots are formed on the light guide plate and, instead, travels towards the top of the light guide plate. Controlling the density of the dots in each location would make it possible to control the amount of light projecting outward from the location. Precisely designed dots of a light guide plate would allow the lights incident from two ends to uniformly spread over the entirety of the surface. The dot structure may include a micro-lens and the contour of the micro-lens could be spherical, conic, ellipsoidal, or tetrahedral prism. Dot structures that are printed on the bottom of a light guide plate through a printing operation are also available and such dots are generally while ink dots that present high diffuse reflectance.

SUMMARY OF THE INVENTION

Thus, an object of the present invention is to provide a method for improving luminance uniformity of side-edge curved module, which improves luminance uniformity of a curved module and enhances the taste of the module without increasing product design expenditures.

To achieve the above object, the present invention provides a method for improving luminance uniformity of a side-edge curved module, which comprises:

(1) dividing a display zone of a curved panel display zone into a plurality of panel grid cells and sequentially marking the plurality of grid cells as panel grid cells 1-n, where n is a natural number;

(2) dividing a light guide plate located exactly under the curved panel display zone into a plurality of corresponding light guide plate grid cells, each of the light guide plate grid cells having a dot density being indicated by $P_n$;

(3) measuring transmittance of each of the panel grid cells, the transmittance of each of the panel grid cells being indicated by $t_n$; and (4) taking the transmittance $t_c$ of the panel grid cell c that is located close to a center of the curved panel display zone as a reference, where c is a natural number less than n and the dot density of the light guide plate grid cell c corresponding to the panel grid cell c is indicated by $P_c$, wherein the dot density $P_n$ of a light guide plate grid cell n is set between $P_c \times 0.25 \times t_c/t_n$ to $P_c \times 4 \times t_c/t_n$.

Wherein, in Step 4, the dot density $P_n$ of the light guide plate grid cell n is set between $P_c \times 0.6 \times t_c/t_n$ to $P_c \times 1.5 \times t_c/t_n$.

Wherein in Step 3, transmittance of a sample dot of each of the panel grid cells is designated to stand for the transmittance of the panel grid cell where the sample dot is located.

Wherein in Step 1, the display zone of the curved panel is divided according to a 9×9 array into 81 panel grid cells and in Step 4, the panel grid cell c that is located close to the center is the 41st one of the panel grid cells.

Wherein with a linear length of the curved panel display zone being designated by W and a linear width of the curved panel display zone being designated by H, the panel grid cells at four corners of the 9×9 array of the panel grid cells each have a light of 3W/20 and a width of 3H/20, while the remaining ones of the panel grid cells selectively have a length of W/10 or a width of H/10.

Wherein the sample points have a spacing distance of W/10 in the lengthwise direction and H/10 in the widthwise direction.

Wherein in Step 1, the display zone of the curved panel is divided according to a 10×10 array into 100 panel grid cells.

Wherein in Step 1, the display zone of the curved panel is divided according to a 11×11 array into 121 panel grid cells.

The present invention also provides a method for improving luminance uniformity of a side-edge curved module, which comprises:

(1) dividing a display zone of a curved panel display zone into a plurality of panel grid cells and sequentially marking the plurality of grid cells as panel grid cells 1-n, where n is a natural number;

(2) dividing a light guide plate located exactly under the curved panel display zone into a plurality of corresponding light guide plate grid cells, each of the light guide plate grid cells having a dot density being indicated by Pn;

(3) measuring transmittance of each of the panel grid cells, the transmittance of each of the panel grid cells being indicated by tn; and (4) taking the transmittance tc of the panel grid cell c that is located close to a center of the curved panel display zone as a reference, where c is a natural number less than n and the dot density of the light guide plate grid cell c corresponding to the panel grid cell c is indicated by Pc, wherein the dot density Pn of a light guide plate grid cell n is set between Pc×0.25×tc/tn to Pc×4×tc/tn;

wherein in Step 4, the dot density Pn of the light guide plate grid cell n is set between Pc×0.6×tc/tn to Pc×1.5×tc/tn.

In Step 3, transmittance of a sample dot of each of the panel grid cells is designated to stand for the transmittance of the panel grid cell where the sample dot is located.

In Step 1, the display zone of the curved panel is divided according to a 9×9 array into 81 panel grid cells and in Step 4, the panel grid cell c that is located close to the center is the 41st one of the panel grid cells.

With a linear length of the curved panel display zone being designated by W and a linear width of the curved panel display zone being designated by H, the panel grid cells at four corners of the 9×9 array of the panel grid cells each have a light of 3W/20 and a width of 3H/20, while the remaining ones of the panel grid cells selectively have a length of W/10 or a width of H/10.

The sample points have a spacing distance of W/10 in the lengthwise direction and H/10 in the widthwise direction.

The present invention can help eliminate dark zones of curved module, improve the uniformity of luminance, and enhance product taste and acceptability of customers, without increase product design expenditure.

BRIEF DESCRIPTION OF THE DRAWINGS

The technical solution, as well as other beneficial advantages, of the present invention will be apparent from the following detailed description of embodiments of the present invention, with reference to the attached drawing. In the drawing:

FIG. 4C is a schematic view illustrating arrangement of light guide plate grid cells according to the preferred embodiment of the present invention;

FIG. 5A is a schematic view illustrating distribution of transmittance of the panel grid cells of the preferred embodiment of the present invention;

DETAILED DESCRIPTION OF THE PREFERRED EMBODIMENTS

Figure 3:
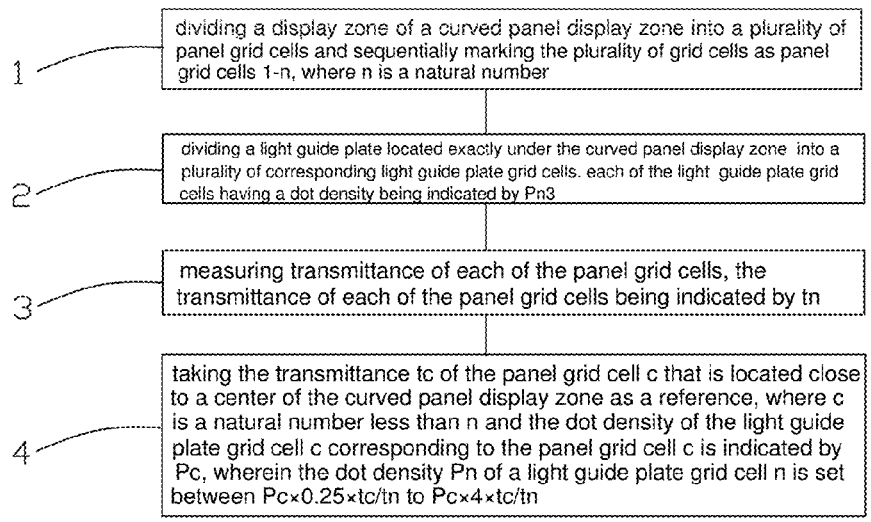
FIG. 3 is a flow chart illustrating a method for improving luminance uniformity of a side-edge curved module.

Referring to FIG. 3, a flow chart is given to illustrate a method for improving luminance uniformity of a side-edge curved module according to the present invention. The method generally comprises the following steps:

Step 1: diving a display zone of a curved panel into a plurality of panel grid cells and sequentially marking the plurality of grid cells as panel grid cells 1-n, where n is a natural number;

Step 2: dividing a light guide plate located exactly under the curved panel display zone into a plurality of corresponding light guide plate grid cells, each of the light guide plate grid cells having a dot density being indicated by Pn;

Step 3: measuring transmittance of each of the panel grid cells, the transmittance of each of the panel grid cells being indicated by tn, wherein the transmittance of a sample dot may be used to indicate the transmittance of the specific panel grid cell in which the sample dot is located and one dot may be taken for each panel grid cell and alternatively, an average of a plurality of dots may be taken; and Step 4: taking the transmittance tc of the panel grid cell c that is located close to a center of the curved panel display zone as a reference, where c is a natural number less than n and the dot density of the light guide plate grid cell c corresponding to the panel grid cell c is indicated by Pc, wherein the dot density Pn of a light guide plate grid cell n is set between Pc×0.25×tc/tn to Pc×4×tc/tn. Preferably, the value of Pn is set between Pc×0.6×tc/tn to Pc×1.5×tc/tn, such as Pn=Pc×tc/tn.

A more detailed description of the method for improving luminance uniformity of a side-edge curved module according to the present invention will be given with further reference to FIGS. 4A-8.

Figures 4A, 4B:
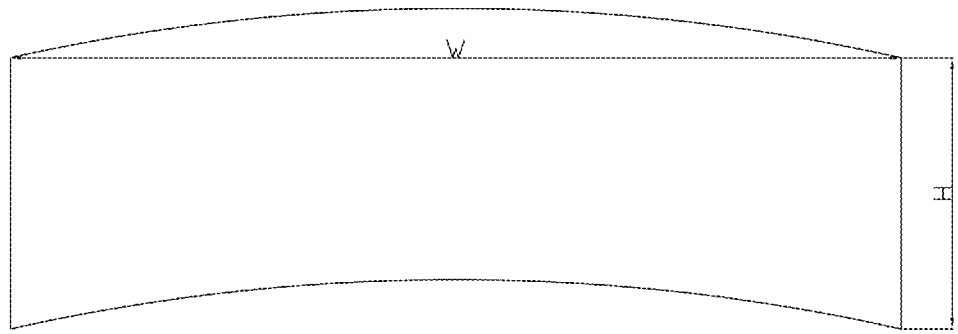
FIG. 4A is a schematic view illustrating the specifications of a curved panel according to a preferred embodiment of the present invention.
FIG. 4B is a schematic view illustrating arrangement of panel grid cell on a curved panel according to the preferred embodiment of the present invention.

According to Step 1, the display zone of the curved panel is divided into 81 dots and 81 grid cells and each dot corresponds to one of the grid cells. As shown in FIG. 4A, which is a schematic view illustrating the specifications of a curved panel according to a preferred embodiment of the present invention, reference character W indicates a linear length of the curved panel display zone measured along a straight line and reference character H indicates a linear width of the curved panel display zone measured along a straight line. As shown in FIG. 4B, which is a schematic view illustrating an arrangement of the panel grid cell on the curved panel according to the preferred embodiment of the present invention, the panel grid cells that are located at four corners are set to have a length of 3W/20 and a width of 3H/20, while the remaining ones of the panel grid cells have a length of W/10 and/or a width of H/10. The sampling dots are set to have a spacing distance of W/10 in the lengthwise direction and H/10 in the widthwise direction.

As shown in FIG. 4C, a schematic view is given to illustrate an arrangement of the light guide plate grid cells according to the preferred embodiment of the present invention. According to Step 2, an area of the light guide plate (LGP) that is located exactly under the display zone of the curved panel is similarly divided into 81 grid cells. This allows each of the panel grid cells to have one LGP grid cell located exactly thereunder and corresponding thereto (bearing corresponding sequential numbers).

Figures 5B, 6:
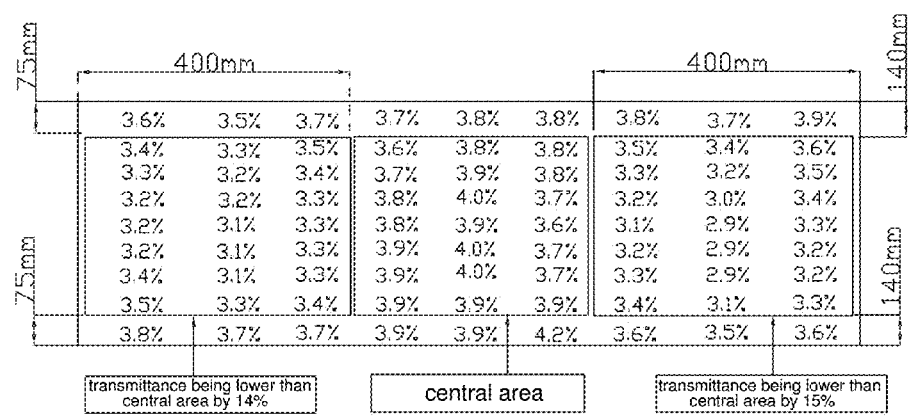
FIG. 5B is a schematic view illustrating distribution of dot density of the light guide plate grid cell of the preferred embodiment of the present invention.
FIG. 6 is a schematic view illustrating measurement data of the transmittance of the panel grid cells of the preferred embodiment of the present invention.

According to Step 3, the distribution of the transmittance (Tr) of the 81 dots of the curved panel are measured, where the transmittance of each dot approximately represents the transmittance of the specific grid cell in which the dot is located. Referring to FIGS. 5A and 6, FIG. 5A is a schematic view illustrating the distribution of the transmittance of the panel grid cells of the preferred embodiment of the present invention, showing the distribution of the transmittance of the 81 dots, and FIG. 6 is a schematic view illustrating measurement data of the transmittance of the panel grid cells of the preferred embodiment of the present invention, showing the empirically measured transmittance of each of the dots.

Figure 7:
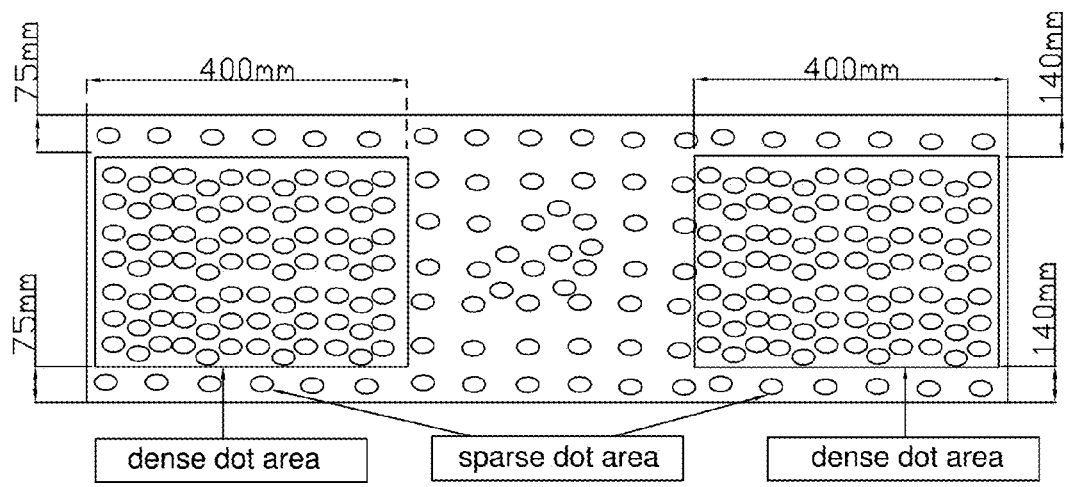
FIG. 7 is a schematic view illustrating a design of dots of a light guide plate according to the preferred embodiment of the present invention.

As shown in FIG. 5B, a schematic view is given to illustrate the distribution of dot density of the light guide plate grid cell of the preferred embodiment of the present invention. According to Step 4, a central dot of the 81 dots of the panel (which is dot 41 that is hatched in FIG. 4B) is taken as a reference for transmittance. The transmittance of the central dot 41 is set as t41 and the dot density (the number of dots in a unit area) of the LGP grid cell located exactly thereunder is P41. For a different dot of the 81 dots of the panel, (which is assumed to be the nth dot), the transmittance is indicated as tn and then, the dot density of the LGP grid cell located exactly under the dot is set between P41×0.6×t41/tn and P41×1.5×t41/tn, the specific value thereof being related to the size of the dot and the location of the grid cell, as shown in FIG. 5B. Referring to FIG. 7, which is a schematic view illustrating an example design of the dots of the light guide plate according to the preferred embodiment of the present invention, the distribution of the dot density of the preferred embodiment obtained in Step 4 is shown.

A further explanation is given as follows. If the LGP dots, similar to the conventional ones, are not modified to present a unique design, then the dots are sparsely distributed at a light incident portion of which the dot density is around 0.25-0.8 times of that of a central portion, while the dots are distributed more densely at a distant portion, of which the dot density is around 1.25-4 times of that of the central portion; and the dot densities of other portions are between the two values (namely between 0.25-0.8 and 1.25-4). For easy illustration, it is assumed that the backlighting at different dots is of similar luminance, which is 10,000 nits, before the unique design of the LGP dots is made. After assembly with a curved panel to form a module, due to the transmittance of the panel being different at different locations, the luminance of the module would not be uniform. Generally, the transmittance at a central portion is greater than that at a peripheral portion. As shown in FIG. 5A, t41 is greater than t1. Assuming t41=4.2% and t1=3.6%, then the luminance of a central area (where t41 is located in FIG. 5A, namely the grid cell 41 of FIG. 4C) is 10000×t41=420 nits. The luminance of a peripheral area (where t1 is located in FIG. 5A, namely the grid cell 1 of FIG. 4C) is 10000×t1=360 nits. This shows the peripheral portion is darker than the central portion by around 15%.

To reduce the difference of luminance, the density of the dots in the periphery of the LGP must be increased. In the area where the periphery t1 is located, the dot density must be changed to t41/t1=4.2%/3.6%=1.167 times of the original density, namely (0.25-0.8)×t41/t1=(0.25-0.8)×1.167 times of the dot density of the center. In an ideal condition, the module luminance in such an area would be increased to 1.167 times of the original one, namely 360×1.167=420 nits, this being similar to the luminance of the center.

In summary, if the transmittance of an area (a grid cell) of a panel is tn and the transmittance of a central area is t41, then the dot density should be changed to t41/tn times of the original one, where with the original dot density being 0.25-4 times of the central area (wherein most areas is between 0.6-1.5 times of the central one according to the locations thereof), whereby the dot density of the area is 0.25×t41/tn–4×t41/tn times of that of the center, preferably between 0.6×t41/tn–1.5×t41/tn.

Figure 1A:
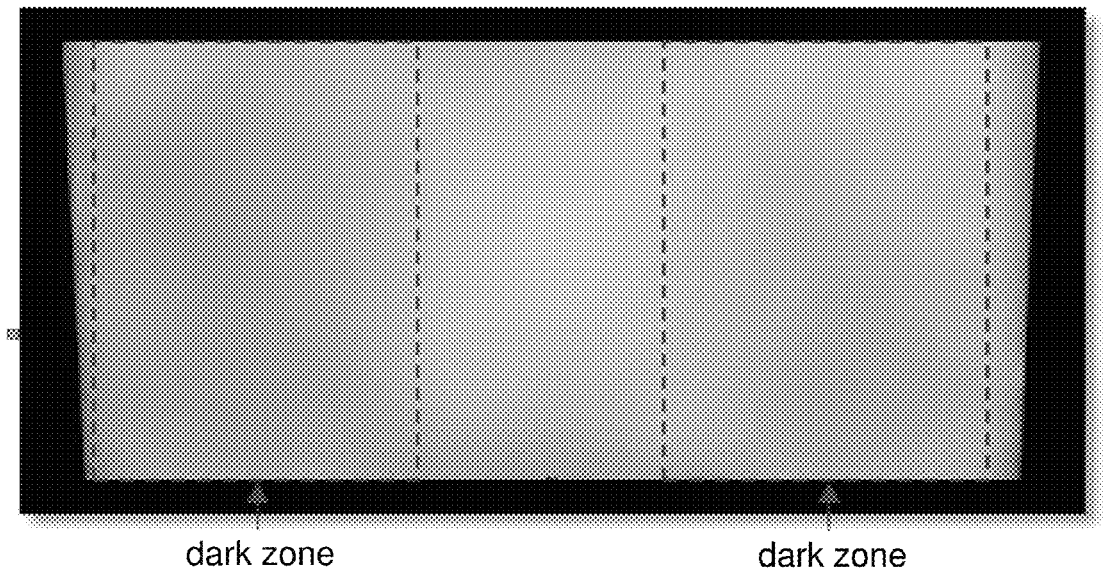
FIG. 1A is a schematic view showing a conventional curved module.
Figure 1B:
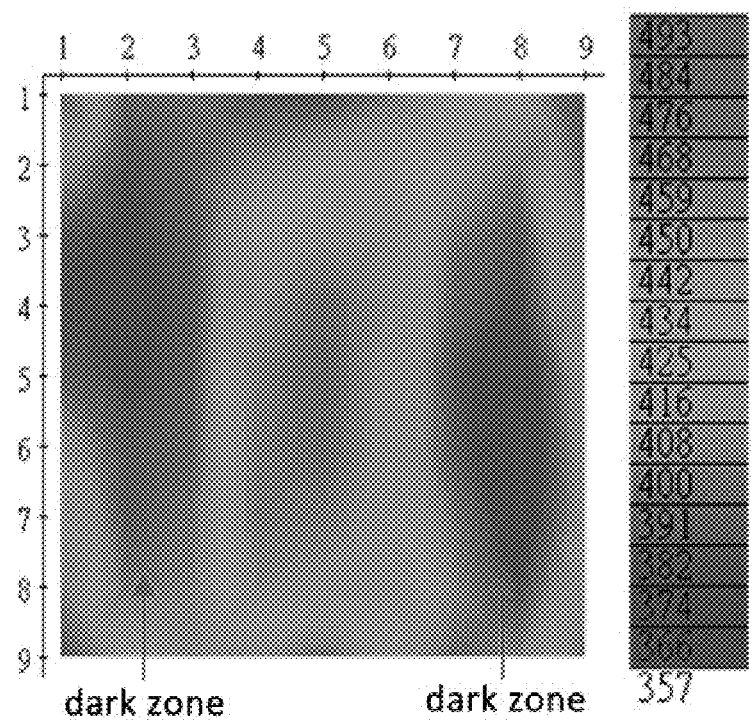
FIG. 1B is a simulated luminance distribution diagram of the conventional curved module.
Figure 2:
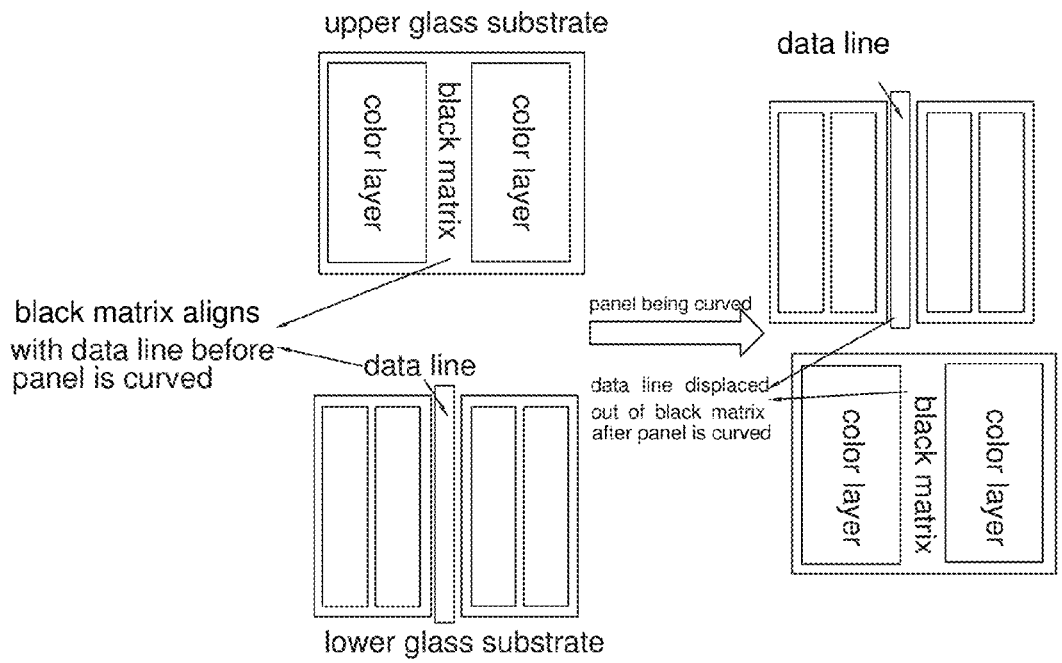
FIG. 2 is a schematic view illustrating a theorem that luminance uniformity deteriorates in a conventional curved module.
Figure 8:
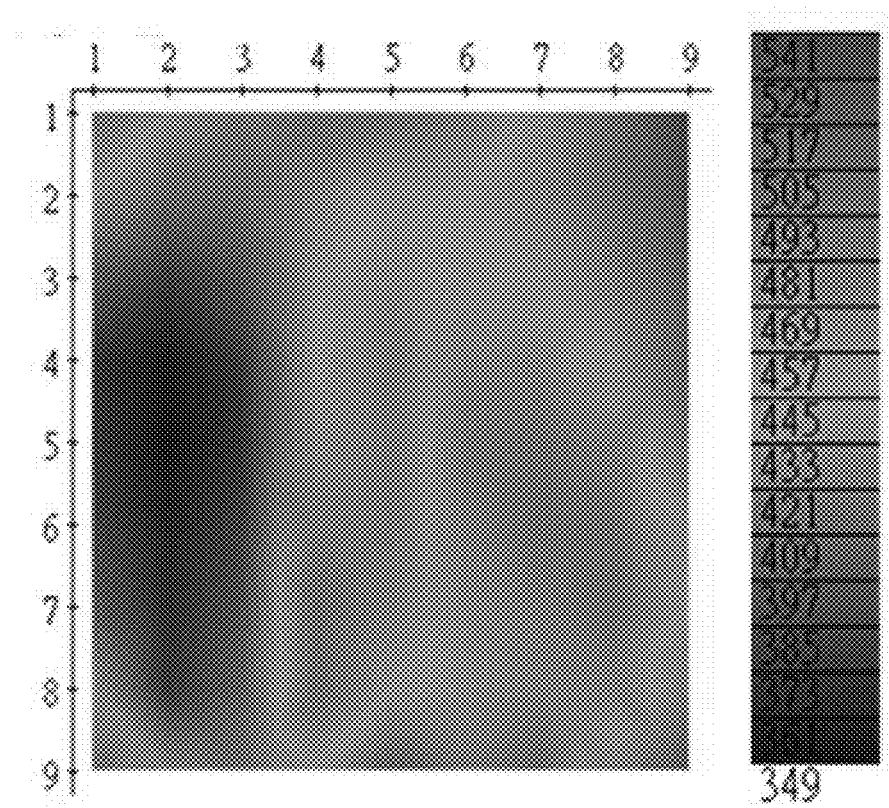
FIG. 8 is a simulated luminance distribution diagram of a curved module with improvement being made with application of the method according to the preferred embodiment of the present invention.

Referring to FIG. 8, which is a simulated luminance distribution diagram of a curved module with improvement being made with application of the method according to the preferred embodiment of the present invention, in which a color brightness diagram is shown to indicate the distribution of luminance of the curved module, comparing with FIG. 1B indicates the luminance uniformity of the curved module is enhanced after the improvement has been made.

In the above technical solution, the display zones of a panel and the corresponding LGP zones are each 81 zones. Technical people of this field would appreciate that other numbers of the divided zones, such as 10×10=100 zones and 11×11=121 zones, can also be used according to the desired accuracy. The selection of the central panel grid cell that serves as a reference can be made according to what is needed and it can be a grid cell exactly at the center or one that set in a neighboring portion.

In summary, the present invention provides, specifically for a side-edge curved module, a unique arrangement of LGP dots for improving luminance uniformity of the curved module and enhancing the taste thereof. Through measurement of the distribution of transmittance of a curved panel, a unique arrangement of LGP dots may be made according to the distribution of the transmittance of the panel. For areas where the transmittance is low, the LGP dots are arranged densely and for areas where the transmittance is high, the LGP dots are arranged sparsely. The present invention can help eliminate dark zones of curved module, improve the uniformity of luminance, and enhance product taste and acceptability of customers.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for improving luminance uniformity of a side-edge curved module by providing a backlight module comprising a light guide plate and a light source in such a way that a surface of the light guide plate comprises dots that are arranged through a process comprising the following steps:

(1) dividing a display zone of a curved panel display zone of the side-edge curved module into a plurality of panel grid cells through horizontal lines and vertical lines that are imaginarily provided on the display zone and intersect each other to divide the display zone into a plurality of segments that respectively correspond to and form the plurality of panel grid cells on the display zone, and sequentially marking the plurality of grid cells as panel grid cells 1-N, where N is a natural number;

(2) dividing the light guide plate that is located exactly under the curved panel display zone into a plurality of light guide plate grid cells through horizontal lines and vertical lines that are imaginarily provided on the light guide plate and intersect each other to divide the light guide plate into a plurality of sections that respectively correspond to the and form the plurality of light guide plate grid cells, wherein the light guide plate grid cells are arranged to respectively correspond to the plurality of the panel grid cells, the dots that are provided on the surface of the light guide plate being such that each of the light guide plate grid cells comprises a number of the dots arranged therein to provide a dot density associated with the light guide plate grid cell, the dot density of the light guide plate grid cell being indicated by Pn, where n is between 1 and N;

(3) measuring transmittance of each of the plurality of panel grid cells, the transmittance of each of the plurality of panel grid cells being indicated by tn, where n is between 1 and N; and (4) taking the transmittance tc of a predetermined one of the panel grid cells that is located close to a center of the curved panel display zone as a reference, the predetermined one of the panel grid cells being denoted panel grid cell c, where c is a natural number less than N and the dot density of one of the light guide plate grid cells, denoted light guide plate grid cell c and corresponding to the panel grid cell c is indicated by Pc, wherein the dot density Pn of a light guide plate grid cell n is set between Pc×0.25×tc/tn to Pc×4×tc/tn, where n is between 1 and N.

2. The method for improving luminance uniformity of a side-edge curved module as claimed in claim 1, wherein in Step 4, the dot density Pn of the light guide plate grid cell n is set between Pc×0.6 ×tc/tn to Pc×1.5×tc/tn.

3. The method for improving luminance uniformity of a side-edge curved module as claimed in claim 1, wherein in Step 3, transmittance of a sample dot of each of the panel grid cells is designated to stand for the transmittance of the panel grid cell where the sample dot is located.

4. The method for improving luminance uniformity of a side-edge curved module as claimed in claim 3, wherein in Step 1, the display zone of the curved panel is divided according to a 9×9 array into 81 panel grid cells and in Step 4, the panel grid cell c that is located close to the center is the 41st one of the panel grid cells.

5. The method for improving luminance uniformity of a side-edge curved module as claimed in claim 4, wherein with a linear length of the curved panel display zone being designated by W and a linear width of the curved panel display zone being designated by H, the panel grid cells at four corners of the 9×9 array of the panel grid cells each have a light of 3W/20 and a width of 3H/20, while the remaining ones of the panel grid cells selectively have a length of W/10 or a width of H/10.

6. The method for improving luminance uniformity of a side-edge curved module as claimed in claim 5, wherein the sample points have a spacing distance of W/10 in the lengthwise direction and H/10 in the widthwise direction.

7. The method for improving luminance uniformity of a side-edge curved module as claimed in claim 1, wherein in Step 1, the display zone of the curved panel is divided according to a 10×10 array into 100 panel grid cells.

8. The method for improving luminance uniformity of a side-edge curved module as claimed in claim 1, wherein in Step 1, the display zone of the curved panel is divided according to a 11×11 array into 121 panel grid cells.

9. method for improving luminance uniformity of a side-edge curved module by providing a backlight module comprising a light guide plate and a light source in such a way that a surface of the light guide plate comprises dots that are arranged through a process comprising the following steps:

(1) dividing a display zone of a curved panel display zone of the side-edge curved module into a plurality of panel grid cells through horizontal lines and vertical lines that are imaginarily provided on the display zone and intersect each other to divide the display zone into a plurality of segments that respectively correspond to and form the plurality of panel grid cells on the display zone, and sequentially marking the plurality of grid cells as panel grid cells 1-N, where N is a natural number;

(2) dividing the light guide plate that is located exactly under the curved panel display zone into a plurality of light guide plate grid cells through horizontal lines and vertical lines that are imaginarily provided on the light guide plate and intersect each other to divide the light guide plate into a plurality of sections that respectively correspond to the and form the plurality of light guide plate grid cells, wherein the light guide plate grid cells are arranged to respectively correspond to the plurality of the panel grid cells, the dots that are provided on the surface of the light guide plate being such that each of the light guide plate grid cells comprises a number of the dots arranged therein to provide a dot density associated with the light guide plate grid cell, the dot density of the light guide plate grid cell being indicated by Pn, where n is between 1 and N;

(3) measuring transmittance of each of the plurality of panel grid cells, the transmittance of each of the plurality of panel grid cells being indicated by tn, where n is between 1 and N; and (4) taking the transmittance tc of a predetermined one of the panel grid cells that is located close to a center of the curved panel display zone as a reference, the predetermined one of the panel grid cells being denoted panel grid cell c, where c is a natural number less than N and the dot density of one of the light guide plate grid cells, denoted light guide plate grid cell c and corresponding to the panel grid is indicated by Pc, wherein the dot density Pn of a light guide plate grid cell n is set between a lower bond that is equal to or greater than Pc×0.25×tc/tn and an upper bound that is equal to or smaller than Pc×4×tc/tn, where n is between 1 and N;

wherein in Step 4, the lower bound and the upper bound of the dot density Pn of the light guide plate grid cell n are respectively Pc×0.6×tc/tn and Pc×1.5×tc/tn.

10. The method for improving luminance uniformity of a side-edge curved module as claimed in claim 9, wherein in Step 3, transmittance of a sample dot of each of the panel grid cells is designated to stand for the transmittance of the panel grid cell where the sample dot is located.

11. The method for improving luminance uniformity of a side-edge curved module as claimed in claim 10, wherein in Step 1, the display zone of the curved panel is divided according to a 9×9 array into 81 panel grid cells and in Step 4, the panel grid cell c that is located close to the center is the 41st one of the panel grid cells.

12. The method for improving luminance uniformity of a side-edge curved module as claimed in claim 11, wherein with a linear length of the curved panel display zone being designated by W and a linear width of the curved panel display zone being designated by H, the panel grid cells at four corners of the 9×9 array of the panel grid cells each have a light of 3W/20 and a width of 3H/20, while the remaining ones of the panel grid cells selectively have a length of W/10 or a width of H/10.

13. The method for improving luminance uniformity of a side-edge curved module as claimed in claim 12, wherein the sample points have a spacing distance of W/10 in the lengthwise direction and H/10 in the widthwise direction.

* * * * *